United States Patent
Qian et al.

(10) Patent No.: US 7,590,094 B2
(45) Date of Patent: Sep. 15, 2009

(54) TRISTATE REQUESTS FOR FLEXIBLE PACKET RETRANSMISSION

(75) Inventors: Feng Qian, Mission Viejo, CA (US); Stanislaw Czaja, Cardiff, CA (US)

(73) Assignee: VIA Telecom Co., Ltd. (KY)

( * ) Notice: Subject to any disclaimer, the term of this patent is extended or adjusted under 35 U.S.C. 154(b) by 918 days.

(21) Appl. No.: 10/947,825

(22) Filed: Sep. 23, 2004

(65) Prior Publication Data

US 2005/0068908 A1 Mar. 31, 2005

Related U.S. Application Data

(60) Provisional application No. 60/506,343, filed on Sep. 25, 2003.

(51) Int. Cl.
*H04W 4/00* (2006.01)

(52) U.S. Cl. .................................... 370/332

(58) Field of Classification Search .............. None
See application file for complete search history.

(56) References Cited

U.S. PATENT DOCUMENTS

| | | | |
|---|---|---|---|
| 6,289,003 B1 * | 9/2001 | Raitola et al. | 370/278 |
| 6,421,370 B1 | 7/2002 | Yasaki | |
| 6,445,916 B1 * | 9/2002 | Rahman | 455/423 |
| 6,775,254 B1 * | 8/2004 | Willenegger et al. | 370/329 |
| 6,889,041 B2 | 5/2005 | Miyoshi et al. | |
| 7,006,828 B1 | 2/2006 | Czaja et al. | |
| 7,013,143 B2 | 3/2006 | Love et al. | |
| RE39,177 E | 7/2006 | Padovani et al. | |
| 7,126,928 B2 | 10/2006 | Tiedemann et al. | |
| 7,346,035 B2 | 3/2008 | Lee et al. | |
| 7,349,373 B2 | 3/2008 | An et al. | |
| 7,352,717 B2 | 4/2008 | Knisely et al. | |
| 2002/0168945 A1 | 11/2002 | Hwang et al. | |
| 2003/0072266 A1 | 4/2003 | Uesugi et al. | |
| 2003/0152031 A1 | 8/2003 | Toskala et al. | |
| 2003/0174677 A1 | 9/2003 | Mantha | |
| 2004/0097234 A1 | 5/2004 | Rajkotia et al. | |
| 2004/0258096 A1 | 12/2004 | Yoon et al. | |

(Continued)

FOREIGN PATENT DOCUMENTS

EP 1392076 A1 2/2004

(Continued)

OTHER PUBLICATIONS

"Active ACK for E-DCH", 3GPP TSG-RAN WG1 Release-6 Adhoc, Prague, Czech Republic, Aug. 16-20, 2004, 2 pages.

(Continued)

*Primary Examiner*—Raj Jain
(74) *Attorney, Agent, or Firm*—James W. Huffman; Jaquez & Associates (57) ABSTRACT

Extending acknowledgement messages from two states to at least three states is described, whereby such messages constitute a packet quality indication (PQI) reflecting quality or usability of the received signal. In an HARQ system, a transmitting station can flexibly select a better alternative for the next information to transmit on the basis of such PQI. One aspect includes determining how best to correct an unsuccessful packet transmission based on quality information about the specific packet. Implementing apparatus and procedures are described.

16 Claims, 4 Drawing Sheets

U.S. PATENT DOCUMENTS

| | | | |
|---|---|---|---|
| 2005/0053032 | A1 | 3/2005 | Itoh |
| 2005/0068908 | A1 | 3/2005 | Qian et al. |
| 2005/0181811 | A1 | 8/2005 | Magnusson et al. |
| 2005/0181834 | A1 | 8/2005 | Chen et al. |
| 2005/0250511 | A1 | 11/2005 | Xiao et al. |
| 2006/0007953 | A1 | 1/2006 | Vesma et al. |
| 2006/0077919 | A1 | 4/2006 | Gerkis |

FOREIGN PATENT DOCUMENTS

| | | |
|---|---|---|
| WO | WO 02/052771 A2 | 7/2002 |
| WO | WO 2005/015941 A2 | 2/2005 |

OTHER PUBLICATIONS

Czaja, et al., "Cell Selection Soft Handoff", 3GPP2/TSG-C50-2000212-008, Feb. 12, 2000, pp. 1-4.

Czaja, et al., "Cell Selection Handoff—Additional Simulation Results", 3GPP2/TSG-C50-20010816-020, Aug. 16, 2001, pp. 1-13.

Czaja, et al., "Cell Selection Handoff for Voice Services", 3GPP2/TSG-C50-20011105-017, Nov. 5, 2001, pp. 1-15.

NEC, "Enhancement of SSDT for Release 5", TSG-RAN Working Group 1 Meeting #19, TSG R1-01-0275, Las Vegas, USA, Feb. 27-Mar. 2, 2001.

NEC, "System Level Performance of Parallel Operated SSDT and Tx Antenna Diversity Systems", TSG-RAN Working Group 1 Meeting #6, TSG R1#6(99)911 Espoo, Finland, Jul. 13-16, 1999.

Palacian, Lisa, International Search Report received from the European Patent Office dated Dec. 9, 2005 for related appln. No. PCT/US2005/028974, 4 pgs.

Elpenord, Candal, Office Action received from the USPTO dated Aug. 20, 2008 for related U.S. Appl. No. 11/202,959, 28 pgs.

Czaja, et al., Response to Office Action filed in USPTO dated Dec. 22, 2008 for related U.S. Appl. No. 11/202,959, 10 pgs.

Elpenord, Candal, Notice of Allowance received from the USPTO dated Mar. 17, 2009 for related U.S. Appl. No. 11/202,959, 9 pgs.

* cited by examiner

TRISTATE REQUESTS FOR FLEXIBLE PACKET RETRANSMISSION

CROSS REFERENCE TO RELATED APPLICATIONS

This application claims priority under 35 USC 119 to U.S. Provisional Application 60/506,343 by the same inventors, entitled "Method and Apparatus for Enabling Early Re-transmission of Sub-packet 0 in a Wireless Communication System," filed Sep. 25, 2003, the contents of which are hereby incorporated in their entirety by reference.

BACKGROUND

1. Field

This application generally relates to the field of wireless communication systems, and more particularly to signals and protocols to enhance data transmission efficiency in such systems.

2. Related Art

The subject matter set forth herein is applicable to wireless communication systems generally. However, it has been developed primarily in the context of cellular telecommunication systems, which facilitate high-speed connectivity and data and voice transport on both point-to-point and point-to-multipoint bases. First-generation (analog) and second-generation (digital) cellular networks were used primarily for communicating voice traffic via mobile cellular telephones, and thus maintained a focus on access methods for the efficient transport of voice information. With the rising popularity of the Internet, a third-generation (3G) wideband multimedia cellular network has been proposed that transports both voice and data at much higher speeds than were previously available using the first and second generation wireless networks.

A Third Generation Partnership Project 2 (3GPP2) has been established by industry groups for the purpose of defining specifications to transition current code-division multiple-access (CDMA) wireless networks to the third generation, which is commonly referred to as CDMA2000. One such specification may be referred to as "CDMA2000 1x Revision D" (which may also be referred to as "CDMA2000 1x Rev D," "cdma2000 Release D," "IS-2000-D", or "IS-2000-Rel. D"). The CDMA2000 1x Rev D specification, available from the 3GPP2, is incorporated by reference herein in its entirety for its teachings on communications protocols used in 3G wireless communications systems.

Many proposals of communication protocols for use in CDMA2000 Release D have been submitted to the 3GPP2, including protocols for both forward link transmissions from a base station (BS) to a mobile station (MS), and for reverse link transmissions from an MS to a BS. Recently, it was decided that incremental redundancy (IR) will be used for Rel. D reverse link, at least for higher data rates. A synchronous 4-channel hybrid ARQ scheme has been suggested using up to 3 unique subpackets (SPID=00, 01, 10) for each packet. The self-decodable SPID=00 contains all systematic bits and will be transmitted first. The subsequent subpackets contain error checking and correction for the first, self-decodable subpacket, but do not provide sufficient information to reconstruct the content of the packet in the absence of some information from SPID=00.

The R-PDCH includes 4 HARQ channels, allowing four time slots for transmission of each packet. Only three of these slots will be occupied by SPIDs 00, 01, and 10. Accordingly, slot time is available for sending an additional subpacket in the event of decoding failure after 3 sub-packet transmissions. There has been discussion of adopting the SPID sequencing of "00-01-10-00," with retransmission of SPID=00 indexed by 11 because only 2-bits are used for SPID in case that no ACID is used. (An ACID identifies a new HARQ channel, thus indicating the start of a new packet.) Another approach would entail coding the first subpacket as "00" or "11", toggling in consecutive packets so that the 2-bit SPID field serves both as subpacket indicator and AISN.

Clearly, the present IR protocol does not employ the available subpacket slots to convey data as efficiently as possible to the receiver. A need exists for a method and apparatus that will provide subpackets to the receiver in a manner that better utilizes the available slots, and that matches the provided subpackets to the needs of the receiver. A method and apparatus is set forth below to address this need, and will be seen to include a tool that is applicable to many other signaling functions, particularly in packet data communication systems.

SUMMARY

A method and apparatus are disclosed for a transmitter to select one of a multiplicity of different subpackets to be sent to a receiver next, based on which of a multiplicity of reception quality categories a previous subpacket falls within, as indicated by a corresponding reception quality signal sent from the receiver to the transmitter. This, and other improvements described herein, are all employed together in an exemplary embodiment, which, though developed in the context of code division multiplexing (CDM) communications systems, may be employed with suitable modifications in other types of digital communications systems.

One aspect of the disclosed method includes transmitting data packets in a wireless communication system, which includes transmitting subpackets that are each derived from a corresponding ("parent") data packet. The method includes a step of receiving a reception quality signal from the receiving station for each subpacket, such signal indicating in which of several possible reception quality categories a particular subpacket was received. The method includes selecting a next subpacket for transmission under control of the reception quality category that was indicated for a particular previous subpacket. More specifically, if the reception is indicated as belonging to a first quality category (indicating high quality or successful reception), then the selected next subpacket will not be derived from the same parent data packet as the particular received subpacket. If the reception is indicated as belonging to a second, intermediate quality category, then the selected next subpacket will be a first related subpacket derived from the same parent as the particular received subpacket and if the reception is indicated as belonging to a third, lower reception category, then the selected next subpacket will be a different, second related subpacket derived from the same parent. This aspect may be employed in a wireless cellular communication system, in which a subject mobile station is the transmitting station and the receiving station is a base station that concurrently communicates with other mobile stations.

As may be seen, this aspect requires receiving one of at least three different reception quality indications, which may be acknowledgment signals having at least three states; and the selection of a next subpacket may be part of a hybrid automatic retransmission request protocol. To communicate the required three states of quality indication, a zero amplitude reception quality signal may be used to indicate one of the states, in which case one of the other states of reception quality can be indicated by the phase of the reception quality signal. In fact, this aspect can be implemented using just a single symbol for the reception quality signal; and if more robustness is desired, the symbol may be repeated within the overall reception quality signal. This aspect may be limited to receiving (2n+1) different reception quality signals reflecting (2n+1) different corresponding selectable reception quality categories (n a positive integer).

In one aspect the disclosed apparatus includes a transmitter capable of transmitting packet data that has been prepared by a packet data processing module. The processing module is configured to select subpackets to be transmitted to a target receiver; one or more such subpackets are derived from each of a plurality of source (or parent) data packets intended for conveyance to the target receiver. This aspect also includes receiving circuitry configured to receive a corresponding reception quality signal from the target receiver for each transmitted data subpacket. The reception quality signals indicates in which of a multiplicity of distinct selectable reception quality categories each such transmitted data subpacket was received by the target receiver. The processing module has control features configured to select the next subpacket to be transmitted, based on the reception quality signal received for a particular previous subpacket. If the indicated quality was high, then the control features select the next subpacket to be a new subpacket not derived from the same source data packet as the particular previous subpacket. If the indicated quality was somewhat lower (intermediate), then the next subpacket will be a first related subpacket, and will be derived from the same source packet as was the particular previous subpacket. Finally, if the indicated quality was lower yet, then the next subpacket will be a second related subpacket, different from the first related subpacket but also derived from the same source packet as the particular previous subpacket.

This aspect of the apparatus may be a subject mobile station (MS) in a wireless cellular communication system, and the target receiver may be a base station in that system that concurrently communicates independent information with other MSs. The packet data processing module control features may be part of a hybrid automatic retransmission request (HARQ) system within the apparatus, with the reception quality signals recognized as acknowledgement signals in the HARQ system. The signals that indicate the reception quality categories may include a zero amplitude reception quality signal, in which case one of the other reception quality signals may be indicated by the phase of the reception quality signal. This aspect may be limited to apparatus configured to receive 2N+1 different reception quality signals that indicate 2N+1 corresponding different selectable reception quality categories (N a positive integer).

This aspect of the disclosed apparatus may be required to be configured to have the reception quality signal indicated by just a single symbol. Even in such case, however, the single reception quality symbol may be repeated in the reception quality category signal, which, all other things being equal, will significantly improve the probability of correctly receiving the reception quality signal.

Three states or categories of acknowledgment signal (or PQI) may effectively serve to request one of at least three corresponding actions with respect to the underlying packet being conveyed. By taking the history of previous packet transmissions in combination with the current PQI, many more than three corresponding actions may be triggered. One PQI state is generally reserved for positive acknowledgment (ACK), indicating that the packet has been successfully conveyed, in response to which efforts to transmit such packet are generally terminated. A plurality of different NACK states are typically reserved to indicate a corresponding plurality of different PQIs, while also indicating failure to correctly receive the underlying packet. The next packet (and/or subpacket) to be sent in response to particular PQIs may be based upon the recent history of previous transmissions. In a simple incremental redundancy (IR) protocol, an ordinary or weak NACK may cause transmission of the next IR subpacket (based upon the same underlying packet), while an E-NACK causes either a first or systematic subpacket to be sent, or, alternatively, causes the previously transmitted subpacket to be retransmitted.

A signaling scheme is needed for PQI purposes that lends itself to conveying a multiplicity of states. Three states may be provided, for example, by Binary Phase Shift Keying (BPSK), if the signal is sufficiently implicit that its absence (or reduced amplitude) can be reliably detected. Thereby, a single PQI "bit" may convey a "+1," a "−1," or an absence of signal "0." These three indications may correspond, for example, to a positive acknowledgment (ACK), an ordinary or weak negative acknowledgment (NACK), and an enhanced or erasure NACK (E-NACK), respectively. More generally, a receiver may provide a multi-state response in circumstances, such as packet acknowledgment, in which binary signaling has previously been used. Also more generally, a receiver may be configured to flexibly select between different but related data for transmission from the serving transmitter, as needed by the receiver, on the basis of PQI information.

An exemplary transmitter transmits a subpacket to a receiving station, and then identifies a corresponding acknowledgement signal as being one of a multiplicity of states, for example one of three states indicating ordinary negative acknowledgement (NACK), enhanced or negative acknowledgement equivalent to erasure (E-NACK), or positive acknowledgement (ACK). Three such states may be indicated a +1, a −1, and no transmission, respectively, which may be conveyed by a single symbol using BPSK with an added "no transmission" state. The exemplary transmitter responds to the different acknowledgment or PQI signals, when sent, by performing a corresponding one of a multiplicity of actions. For the three-state acknowledgements the transmitter may respond by retransmitting an incrementally redundant subpacket derived from a particular underlying packet, by transmitting a different subpacket that is incrementally redundant of the same underlying packet, or by ceasing transmission of subpackets derived from the underlying packet, respectively. More generally, a transmitter may respond to a multi-state signal which would heretofore have been binary, by following one of a multiplicity of alternative procedures depending upon the state of such multi-state signal. Also more generally, a transmitter may be configured to selectably transmit different incrementally redundant data depending upon a response to previously transmitted data provided from the station receiving such previous data.

BRIEF DESCRIPTION OF THE DRAWINGS

Embodiments of the disclosed method and apparatus will be more readily understood by reference to the following figures, in which like reference numbers and designations indicate like elements.

DETAILED DESCRIPTION

Overview

Packet data communication systems are rarely designed to ensure that packets are correctly received each time they are transmitted. Instead, it is generally more practical to balance the burden of ensuring accurate reception with the burden of retransmitting packets that are determined to be corrupt. A determination as to accuracy may be made after the packet has been forwarded to high level processes, at which point the system may include highly flexible analysis and correction programs. A request for retransmission of defective packets may be formulated by such higher layer processes and then transmitted to the source of the unsatisfactory packet(s). Significant high level system resources, as well as communication bandwidth, may be absorbed to perform such high level "automatic retransmission" processing. When the penalty for retransmission is thus relatively high, optimum efficiency requires that communications must be robust, so as to yield a high percentage of successful communications. To limit the error rate, the average packet must be transmitted with substantial margin, such as by raising the transmission power levels, reducing the coding rates, and so on. In general, a low error rate requires a high Eb/Nt. Maintaining a high Eb/Nt, in turn, burdens the most restricted commodity, effective channel bandwidth, ultimately reducing traffic capacity.

Energy per bit (Eb) may be reduced if a higher bit error rate (BER) is acceptable. Toleration of a higher BER may increase overall traffic capacity in a manner converse to that described above (i.e., reducing transmission power levels frees effective channel bandwidth, ultimately increasing traffic capacity). The processing burdens associated with handling higher error rates may be limited, in part, by performing such processing very close to the physical layer. Such "low layer" processes involve less processing effort for several reasons. Such processing may be tightly coupled to the physical layer, permitting close timing control, which can enable some parameters to be conveyed implicitly, reducing bandwidth that would otherwise be expended on explicit information. Furthermore, processing effort is avoided entirely in the upper layers. Moreover, delays in processing are shorter, which translates to smaller amounts of data that must be stored for future reference, as less uncertain data need be saved for reconsideration.

Hybrid automatic retransmission request (H-ARQ) protocols are used to correct most transmission errors without involving processing layers beyond the physical and media access control (MAC) layers. Packet channels may be interleaved by time multiplexing, such that the next packet for a particular packet channel need not be transmitted until there has been sufficient time to obtain feedback from the receiving station as to the success of the previous packet of such channel.

Numerous H-ARQ protocols are well known by persons skilled in the art, and may for example be based on packet transmissions that are synchronous or asynchronous, interleaved or non-interleaved. Upon receiving a positive acknowledgment (ACK), a packet transmitter generally ceases transmission effort for the corresponding packet, and prepares instead to transmit a new packet (if further packets are queued).

Upon receiving a negative acknowledgment (NACK), however, the packet transmitter takes remedial action to correct the transmission error. In some instances, it will be best to simply retransmit the failed packet. Such retransmitted packet may be combined with the previous packet, using for example Chase combining techniques, to increase the likelihood of accurate detection.

Incremental Redundancy

Incremental redundancy (IR) is another technique for correcting errors in previously transmitted packets. IR involves transmitting a sequence of subpackets which, combined as necessary, convey the information in a particular packet. In an exemplary IR embodiment, three different subpackets are derived from each particular "underlying" packet. The three different subpackets are numbered SPID0, SPID1, and SPID2. In the exemplary embodiment, the first subpacket (SPID0) is self-decodable, i.e., it contains information that is sufficient, if clearly received, to deduce the contents of the underlying packet. SPID1 and SPID2 are "incrementally redundant" packets that are derived from the same underlying packet. They are particularly useful for combining with the information of SPID0 and/or SPID1 to determine the content of the underlying packet, but are not self-decodable. Such IR subpacket transmission protocols may be an efficient alternative, particularly in systems designed to tolerate relatively high transmission error rates.

However, the efficiency of IR protocols may depend on the quality of the received subpackets. In particular, if the self-decodable SPID0 is badly corrupted, then transmitting SPID1 and/or SPID2 will be ineffective to determine the underlying packet contents. As such, transmission of SPID1 or SPID2 would be wasteful, and it would be much better to retransmit SPID0 instead. To avoid inefficiencies resulting from inflexible adherence to a fixed IR subpacket transmission order, a flexible retransmission protocol is set forth herein, together with implementation features for transmitting and receiving stations.

One aspect of a preferred H-ARQ embodiment includes responding to received packets (or subpackets) by transmitting acknowledgment signals having multiple states, rather than merely a positive state (ACK) and a negative state (NACK). A multiple state acknowledgment signal will, in most embodiments, reflect a quality of a particular packet, and thus may be referred to as a Packet Quality Indication (PQI). PQIs will generally convey at least three states, including a positive acknowledgment (ACK) and a plurality of different negative acknowledgments (NACKs).

An ACK indicates that the subpacket to which it corresponds was of sufficient quality to permit correct determination of the content of the underlying packet. An "underlying packet" refers to a data packet intended for communication to a receiver, from which a sequence in incrementally redundant (or otherwise related) subpackets are derived. Further effort to transmit such underlying packet will generally be terminated upon receipt of an ACK PQI in response to a related subpacket. However, the PQIs will generally distinguish between a plurality of different quality indications for NACK PQIs, reflecting a plurality of usability categories for the corresponding subpackets. The plurality of usability categories provides a basis for a data transmitting station to flexibly select between different packets for subsequent transmission.

IR subpackets that are derived from a particular underlying packet are related, and are intended to be combined to determine the content of the underlying packet. IR subpackets may be designed for data combining after decoding, by providing error detection and correction information. However, subpackets that are intended for combination at a raw (or digitized) signal level, for example prior to demodulation and/or decoding, may also be considered IR packets for present purposes. Packets may be designated "IR" subpackets even if some of the subpackets thus designated are substantially identical to the "underlying packet," while others merely provide error detection and correction information. Related IR packets are those that are derived from a common underlying packet whose contents are sought, and/or are intended to aid in determination of such contents. The manner in which content determination assistance is incorporated into IR packets is not germane for present purposes.

In an IR protocol, related subpackets are transmitted until the contents of the underlying packet appear to have been correctly interpreted, which will elicit an ACK. After receiving an ACK, a "new packet" will be transmitted if available. A "new packet" is not related to immediately preceding packets in the sense that it is not intended to aid in the interpretation of a common underlying packet. Many embodiments of the apparatus and method described herein involve H-ARQ protocols, and execution may be restricted, for example, to the physical and media access control (MAC) layers of a communication system. Such restriction may be useful avoid confusion between H-ARQ and higher layer ARQ protocols. Thus, a higher layer ARQ process may direct retransmission of one or more packets, yet such packets may nonetheless be considered "new packets" with respect to H-ARQ operations. If necessary, packets may be denoted as "H-ARQ new packets."

In response to an ACK, most H-ARQ protocols will terminate transmission efforts on the underlying packet, and will begin transmitting a new packet if further data remains to be transmitted. However, it is possible to have a plurality of different ACK states that reflect variations in quality of the particular packet, or of the channel generally. For example, a particularly high signal to noise ratio (SNR) associated with a packet may be acknowledged by an enhanced "ACK+" signal. The transmitting station may utilize such packet quality indication (PQI) information to determine, for example, whether to increase (or decrease) data rates and coding schemes to more efficiently use the channel. However, most embodiments described herein include only a single ACK state of the PQI, and use PQI information to choose between a plurality of alternative transmissions when a packet has been negatively acknowledged.

When a subpacket does not enable the receiving station (e.g. BS) to ascertain the content of the underlying packet, a NACK response is appropriate. A plurality of different NACK states may enable the transmitting station (e.g. MS) to select between alternative packets for the next transmission. In a simple but effective embodiment, two levels of NACK are provided, including an ordinary NACK and an "enhanced" or "erasure" NACK (E-NACK). A NACK indicates that the subpacket was received with sufficient quality to make it useable for IR purposes, so the transmitting station (e.g. MS) may select the next IR subpacket for the next transmission. However, an E-NACK indicates that the corresponding subpacket had such poor quality that combining with further, different IR packets is unlikely to yield accurate interpretation of the underlying packet. In this case, the data transmitting station may select a previous subpacket for retransmission.

In a particular embodiment, the first subpacket in a series of IR subpackets, SPID0, includes all of the "systematic bits" of the underlying packet, and thus is self-decodable. In other words, if all of the information that it contains is extracted at the receiver, then the contents of the underlying packet may be determined. Thus, such packet may be referred to as "self-decodable." Two further IR subpackets, SPID1 and SPID2, are not self-decodable, and thus cannot serve, without a partially useable SPID0, to determine the contents of the underlying packet. Consequently, in the particular embodiment, SPID0 has a special value. If SPID0 is retransmitted, it may be combined with the previously received instance of SPID0 by a technique, such as Chase combining, that takes advantage of information present in the first instance of SPID0.

In a flexible H-ARQ retransmission protocol, a plurality of different NACK signals may indicate that the acknowledged packet belongs to a corresponding category of quality or usability. The categories in a two-level NACK system may simply indicate "useable for IR but not perfect," signaled with a NACK, and "not useable for IR," signaled with an E-NACK. A data transmitting station that employs a flexible IR H-ARQ protocol may respond to a NACK by transmitting the next sequential IR subpacket, and may respond to an E-NACK by retransmitting SPID0 regardless of which subpacket (e.g., SPID0, SPID1, or SPID2) corresponds to the E-NACK. Alternatively, the response to E-NACK may be to retransmit the particular subpacket that elicited the E-NACK from the receiving station (e.g. BS). In this latter alternative, for example, SPID1 would be retransmitted if E-NACK is received in response to a first transmission of SPID1.

Once quality or usability information, as well as transmission success or failure information, is included as part of feedback sent from a data receiving station in acknowledgment of particular packets, flexible retransmission becomes possible. Each NACK reflects a failure to ascertain the content of a particular underlying packet, and elicits transmission of an addition packet that is based upon such failed packet. Flexible retransmission includes receiving a negative acknowledgment (NACK) and corresponding quality information in respect to the content of a particular packet, and responsively transmitting a remedial packet, based upon the particular packet, which is selected from among a plurality of different selectable packets under control of the corresponding quality information.

Figure 1:
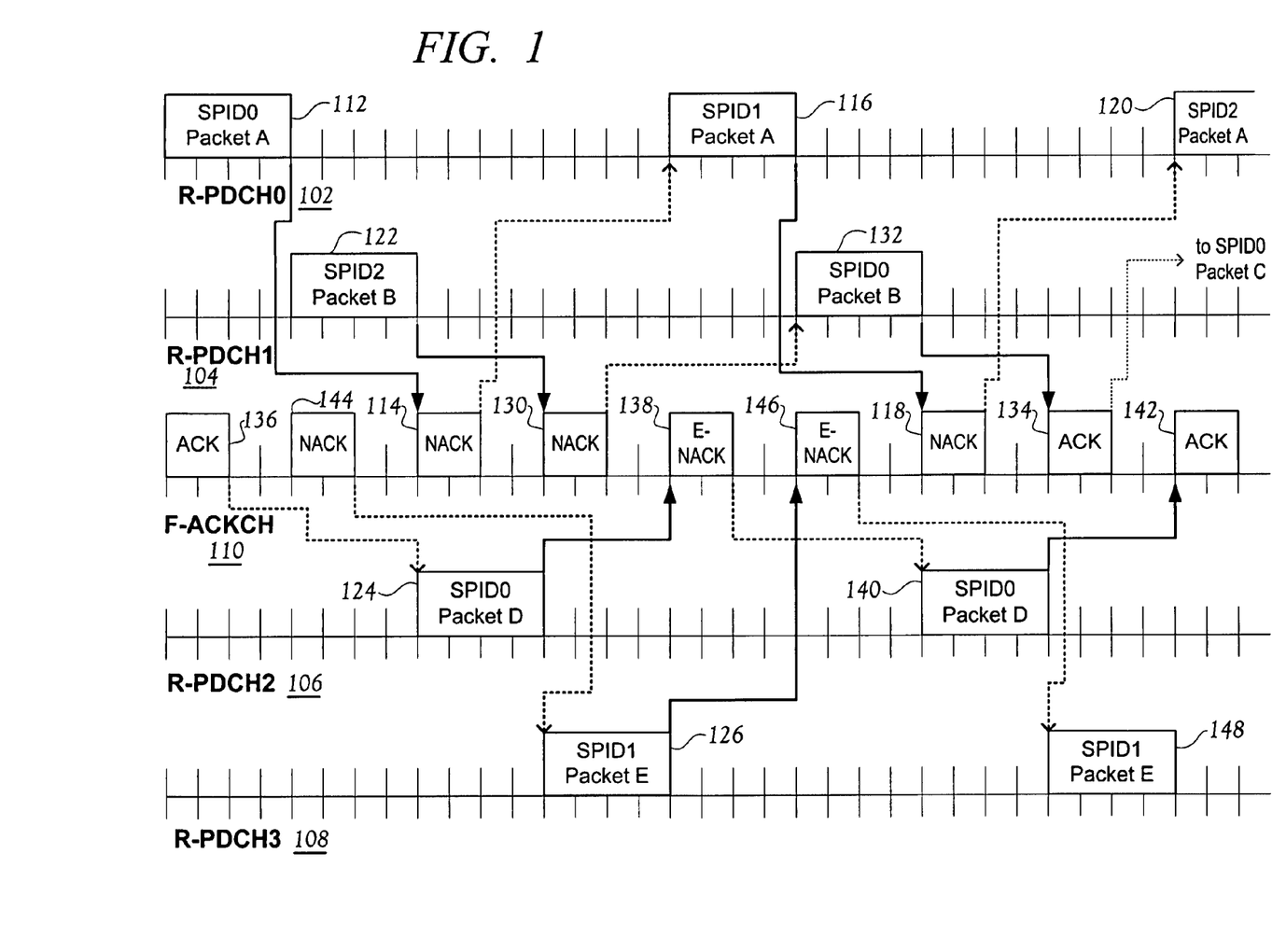
FIG. 1 is a timing diagram illustrating relationships between multi-state acknowledgment signals and data packets for a four channel synchronous incremental redundancy hybrid automatic retransmission request protocol.

FIG. 1 illustrates some timing features of an exemplary four channel interleaved incremental redundancy (IR) packet transmission protocol having flexible retransmission controlled by a PQI (packet quality indicator) that indicates which of a plurality of quality categories applies to particular subpacket transmissions. Four different interleaved subchannels R-PDCH0 102, R-PDCH1 104, R-PDCH2 106 and R-PDCH3 108 are shown for purposes of illustration. However, the four subchannels may merely be parts of an overall reverse packet data channel (R-PDCH) that is transmitted from a mobile station (MS) to a base station (BS), and are conveyed on the same physical channel by means of time division multiplexing (TDM). Each subchannel is represented as a "time" line, with time slots illustrated with "tics" (short lines perpendicular to the time line). Data packets transmitted on such subchannels are indicated by blocks disposed at the appropriate locations along the time line. Different packets to be conveyed via the R-PDCH are distinguished by different letter designators. For each different packet (e.g., Packet A, Packet B, etc.), three different, incrementally redundant subpackets 0, 1 and 2 (or 00, 01 and 11) are derived, which are denoted as subpacket identification 0, 1 and 2 (SPID0, SPID1 and SPID2).

Each time slot represents an interval, such as 1.25 ms, used for frame or subframe assembly purposes in an implementing communication system. As shown in FIG. 1, each subpacket occupies four time slots, which may, for example, constitute a total of 5 ms. Each acknowledgment signal is shown to occupy two slots, or 2.5 ms, for convenience of illustration. The time slot duration of subpackets may in fact be variable, rather than each subpacket occupying four such time slots. In many implementations, the forward acknowledgment channel (F-ACKCH) signals transmitted from the BS to the MS (in response to each subpacket transmitted from the MS to the BS) may occupy single timeslots (e.g., 1.25 ms). However, two time slots for such acknowledgments, as illustrated, is certainly possible, and provides more room for text in the illustration.

Block 112 represents a first IR subpacket, 4-slot SPID0, derived from an underlying Packet A. A solid arrow extends from the end of the subpacket 112 to the beginning of a responsive acknowledgment signal 114 on F-ACKCH 110. A predictable timing relationship is maintained between reception of the subpacket and transmission of the responsive acknowledgment signal. Because the acknowledgment signal 114 is transmitted from the BS on a known channel (F-ACKCH 110) at a predictable time after the subject subpacket 112, the correspondence to the subject subpacket 112 may be determined implicitly. Implicit correspondence obviates a need for the acknowledgment signal 114 to explicitly identify the subpacket to which it corresponds, and thus reduces communication overhead.

Acknowledgment signal (or PQI) 114 conveys an ordinary or "weak" NACK, which may indicate that sufficient information is not yet available to determine the contents of underlying Packet A, but that the packet appears to be of adequate quality to benefit from combination with additional IR packets. Such additional IR packets are constructed to provide additional information that will best help the system determine the content of the common underlying packet (e.g., Packet A). For example, the additional subpackets may provide error checking and correction for the first, nominally self-decodable subpacket. Alternatively, the additional subpackets may provide complementary signals intended for combining with preceding packet signals prior to a decoding step.

Under control of the (weak) NACK quality category indicated by the PQI 114, the MS selects the next sequential IR subpacket, SPID1, for transmission in the next slot of R-PDCH0. Dependence of the subpacket selection on the PQI 114 is indicated by the dotted arrow from the end of the PQI 114 to the beginning of the subpacket 116. In the illustration, receipt of subpacket 116 does not result in correct determination of the contents of Packet A, but the quality suggests the information is still useable. Accordingly, the PQI 118 transmitted by the BS in response to subpacket 116 is also an ordinary or weak NACK. As indicated by the dotted arrow (away from the PQI 118), the next subpacket 120 of the R-PDCH0 102 is consequently chosen by the MS to be SPID2, the last of the IR subpacket sequence derived from Packet A.

The protocol illustrated in FIG. 1 is synchronously time division multiplexed, permitting precise interleaving of packets on the four illustrated subchannels of the R-PDCH. Thus, subpacket 122 on R-PDCH1 104 follows immediately after subpacket 112, and is followed sequentially by subpacket 124 on R-PDCH2 106 and subpacket 126 on R-PDCH3 108. Subpacket 122 happens to be an SPID2 derived from a Packet B, and the BS transmits the PQI 130 in response, indicating that Packet B could still not be determined, presumably after receiving the entire sequence SPID0-1-2. Consequently, in the illustrated implementation, SPID0 (derived from the same Packet B) is retransmitted in subpacket 132. The PQI 134 responsive to subpacket 132 is a positive ACK, indicating that the content of Packet B was finally determined. Consequently, the next subpacket selected for transmission on the subchannel R-PDCH1 104 will be a first SPID0 of a different Packet C.

A PQI 136 on the F-ACKCH 110 was a positive ACK. Consequently, the MS selects a first subpacket SPID0 of a new Packet D for the next transmission on the subchannel R-PDCH2 106 at subpacket 124. The BS determines that the quality of subpacket 124 is very low. Therefore, the BS categorizes the subpacket 124 as an "erasure" packet, and indicates the quality by transmitting an E-NACK in a corresponding PQI 138. The MS responds to the PQI 138 by selecting SPID0 of Packet D for retransmission in subpacket 140. A responsive PQI 142 is a positive ACK, indicating that subpacket 140 is of sufficient quality to enable determination of the contents of Packet D.

A PQI 144 is a NACK, presumably indicating that an SPID0 of a Packet E was received with a quality adequate for IR combination, but not sufficient to determine the contents of Packet E. Consequently, in the subpacket 126 the MS transmits the next sequential IR subpacket derived from Packet E, SPID1. A PQI 146 responsive to subpacket 126 is an E-NACK, indicating very low quality. In the illustrated exemplary embodiment, the MS therefore chooses to retransmit the "erased" subpacket SPID1 in a next subpacket 148 of the R-PDCH3 108. In other embodiments, for example depending upon the statistical history of the communications, the MS might in some cases choose to retransmit the self-decodable SPID0 that is based on Packet E in subpacket 148.

Apparatus

Figure 2:
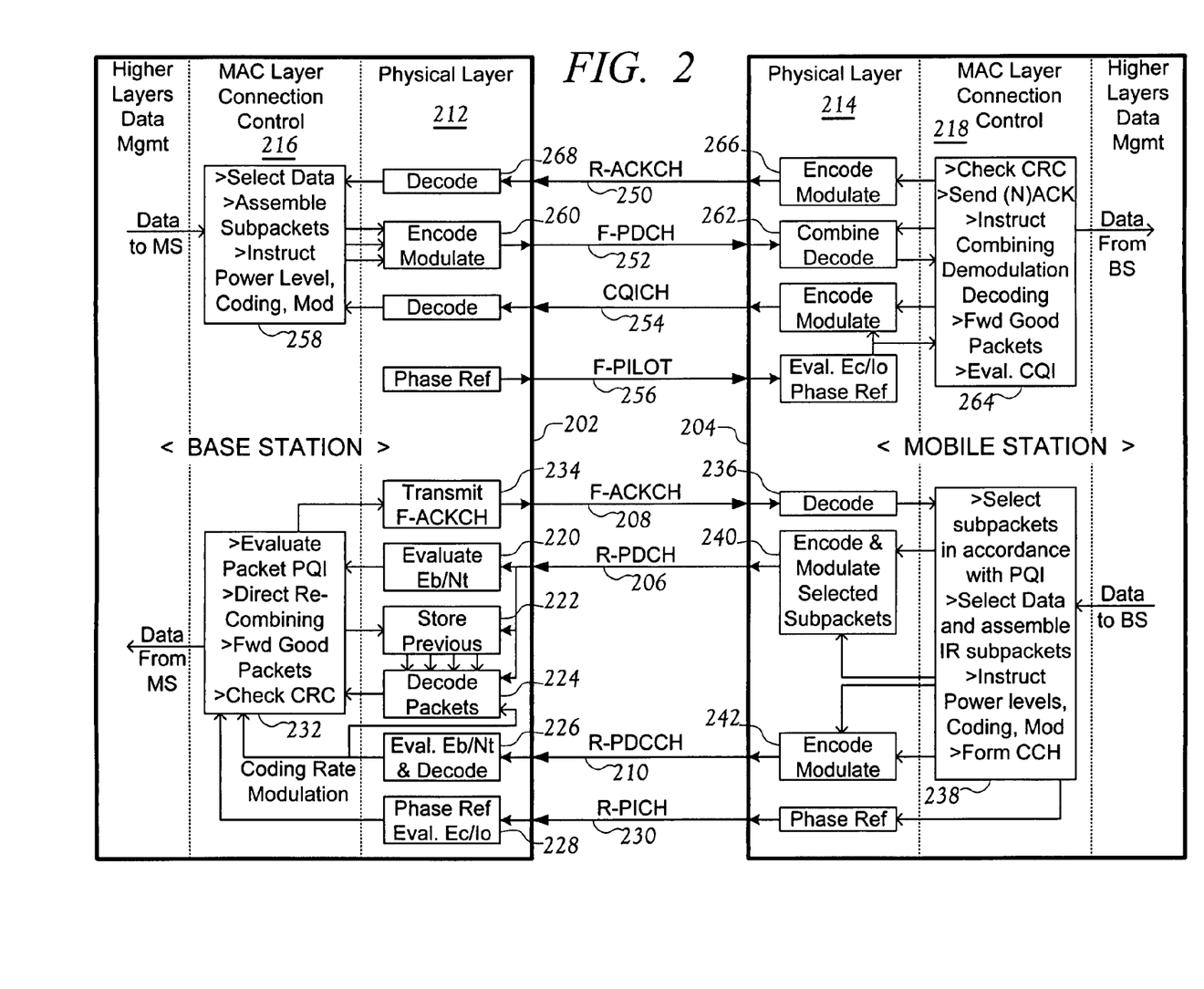
FIG. 2 illustrates features of a mobile station and of a base station that are relevant to retransmission protocols.

FIG. 2 illustrates features of exemplary communications devices. The terminology reflects a CDMA communication system context of development, but equivalent features will be found in other systems as well.

In the exemplary embodiment illustrated, features of a base station (BS) 202 and a mobile station (MS) 204 are shown. Uplink data communications, from the MS 204 to the BS 202, involve an R-PDCH 206 and an F-ACKCH 208 (both functioning, for example, as described with respect to FIG. 1), and also a reverse packet data control channel (R-PDCCH) 210 and reverse pilot channel (R-PICH) 230. Some embodiments are limited to uplink data transmissions from an MS to a BS. FIG. 2 illustrates only functional blocks that are relevant to communication between the BS 202 and the MS 204. Typically, the BS 202 communicates concurrently with numerous other MSs, and the MS 204 also concurrently communicates with a few other transceivers.

The functions of each transceiver are performed in modules that are disposed in particular communication "layers" (substantially as that term is generally understood in the communications arts). In particular, physical transmission or reception of signals, more or less to the level of decoding, is performed in physical layers such as the physical layer 212 of the BS 202, or the physical layer 214 of the MS 204. Control of the use of the communication media (typically wireless spectrum) is provided in a media access control (MAC) layer, such as MAC layer 216 of the BS or MAC layer 218 of the MS. Processing in the MAC layer is very tightly coupled to the physical layer, permitting relatively fast response. (Attribution of particular processing to one layer or the other is often a mere matter of convention, and as a practical matter processing is interchangeable between such close layers.)

Data communicated across the communication media is substantially reconstructed and checked for apparent integrity in the MAC layer before being passed to higher communications layers. Such higher communication layers are lumped together in FIG. 2 and denoted as "Higher Layers Data Mgmt." There the data will be further processed, for example to display an underlying text message. In the higher layers the data may also be examined more thoroughly for integrity. Errors detected there may result in requests for retransmission of certain previous data items in a higher layer ARQ process that is distinct from hybrid automatic retransmission request (H-ARQ) protocols, which are generally effectively limited to the physical and MAC layers.

The BS 202 receives data packets from the MS via the R-PDCH 206. However, according to Rev. D of the CDMA 2000 specification, the data are transmitted in subpackets derived from the data packets, which are then combined as necessary to determine the contents of the underlying data packets. An example of this procedure is illustrated in FIG. 1, and described hereinabove. A subpacket is received via the R-PDCH 206, such as the subpacket 112 of FIG. 1 which contains a first IR subpacket SPID0 based upon an underlying Packet A. The BS 202 endeavors to evaluate a signal-to-noise ratio (Eb/Nt) for the packet in a functional block 220, may store a digitized copy of the signal in a signal storage block 222, and attempts to demodulate and decode the subpacket in a packet decoding block 224.

In this instance the subject subpacket is a "new" packet, a first subpacket SPID0 based upon a new Packet A, and is not derived from a same packet as other recent subpackets. Accordingly, previous subpackets from the signal storage block 222 are not relevant for decoding the subject subpacket. However, when related subpackets have previously been transmitted, then the BS data reception MAC processing block 232 may direct combination of the new (but related) subpacket with the previous related subpackets. Combination may involve Chase combining, in the event that an identical subpacket is retransmitted. Combinations involving error detection and correction information may also take place in the MAC processing block 232. If previous subpackets are designed for signal-level combining, such combining may be performed at the packet decoding block 224 under control of the MAC processing block 232.

The output of packet decoder 224 is passed to the MAC receive processing block 232, where the cyclic redundancy check (CRC) is considered. In this instance the CRC does not check, and decoding fails, so the contents of Packet A have not been correctly derived from the subject subpacket SPID0. Consequently, a negative acknowledgment (NACK) is warranted. In this circumstance, the MAC data reception processing block 232 is configured to evaluate a probable quality of the subject subpacket and to generate a packet quality indication (PQI) that reflects categorization of the subject subpacket into an appropriate one of a plurality of selectable quality categories. Two quality categories may be indicated by PQIs, including an "erasure" or enhanced NACK (E-NACK), which indicates a particularly low quality such that the subject subpacket may be best treated as an erasure, and an ordinary NACK, which indicates a better quality that should permit the subject subpacket to be usefully combined with further related IR subpackets.

Evaluation of Packet PQI in MA C Layer

To select between E-NACK and NACK PQI categories for a subject subpacket, the MAC data reception processing block 232 may consider a variety of information sources. In view of such information, the MAC data reception processing block 232 estimates quality for the particular subject subpacket. If available, a signal to noise (SNR) measure of the signal conveying the actual received subpacket, such as Eb/Nt, may be obtained from the block 220. In addition, or instead, an Eb/Nt measure derived in the block 226 for a packet on the R-PDCCH 210 may be considered. Further, an SNR measure for the general channel conditions for transmissions from the MS 204 to the BS 202 may be obtained as an Ec/Io value from a pilot evaluation block 228 for a reverse pilot channel, such as R-PICH 230. Any information relevant to the quality of the subject subpacket may be considered additionally or alternatively.

For each measurement of channel quality that is relevant to the quality of the subject subpacket, a separate erasure threshold should generally be established. In a two-category NACK protocol, the threshold may reflect a value below which a particular measurement evidences that the subpacket is probably an "erasure" that is substantially unusable. Additional categories will generally be distinguished between additional thresholds.

The threshold for each different source of channel information may be based upon information about the transmission characteristics of the subject subpacket, compared with the transmission characteristics of the source of channel information. Common SNR measurements for data channels, such as Eb/Nt, will be affected not only by the channel, but by transmission power, coding density (code rate) and modulation scheme employed for such source. Thus, such SNR measurements are related numerically to channel quality by a 'scaling factor' that takes into account those (and/or other) relevant conditions. Similarly, the threshold quality of the channel below which a packet is likely to be substantially unusable will depend upon conditions of transmission power, coding density and modulation scheme employed for the subject subpacket. The coding rate and modulation scheme for the subject data subpacket is typically provided by the R-PDCCH.

Because the R-PDCCH output may be essential for decoding a data subpacket, the R-PDCCH is typically transmitted with a relatively high power per bit, conveying a modest amount of data at a modest coding rate and with a relatively robust modulation scheme. Accordingly, an R-PDCCH packet is generally much more likely to be received correctly than is a data subpacket. As such, an Eb/Nt for the R-PDCCH 210 may be more readily available than for the subject data subpacket on the R-PDCH. However, an R-PDCCH packet may not be concurrent with the R-PDCH, if the information was transmitted earlier. If a coincident packet has not been measured, then confidence in such measurement may need to be tempered in view of a statistically expected correlation between the SNR measurement and the subject subpacket quality (hereafter "expected correlation"). Expected correlation may be based upon historical channel variability, in view of time or frequency distinctions.

Ec/Io (or other SNR measurement) calculated by the block 228 for the R-PICH pilot channel 230 may also be used to estimate the quality of the subject packet. Adjustments may be made for the different units of an Ec/Io measurement, and for a relative power of the R-PICH transmission, if known. Depending upon the particular implementation, the Ec/Io measurement may be derived from a period that is not entirely coincident with the subject subpacket transmission period. If the measurement period does not match the transmission period, then it may be useful to weight such pilot SNR measurement in view of its expected correlation to the channel experienced by the subject subpacket.

Thus, packet quality evidence is derived from each channel quality source by comparing the channel quality measurement with the corresponding threshold, which in turn is based upon the conditions of the particular subject packet. The packet quality evidence may be combined to render a composite estimate of packet quality, from which the packet quality indication (PQI) category of the subject subpacket will be determined. For example, the ratio between measurement and threshold for each source may be weighted according to its relevance to the exact channel occupied by the subject subpacket, and further weighted by its reliability based upon its temporal relationship to the transmission of the subject subpacket. Values may be culled if they are substantially deviant and thus appear unreliable. The remaining values may simply be added, according to their weights, to obtain a composite estimate for a PQI category for the subject subpacket.

Figure 3:
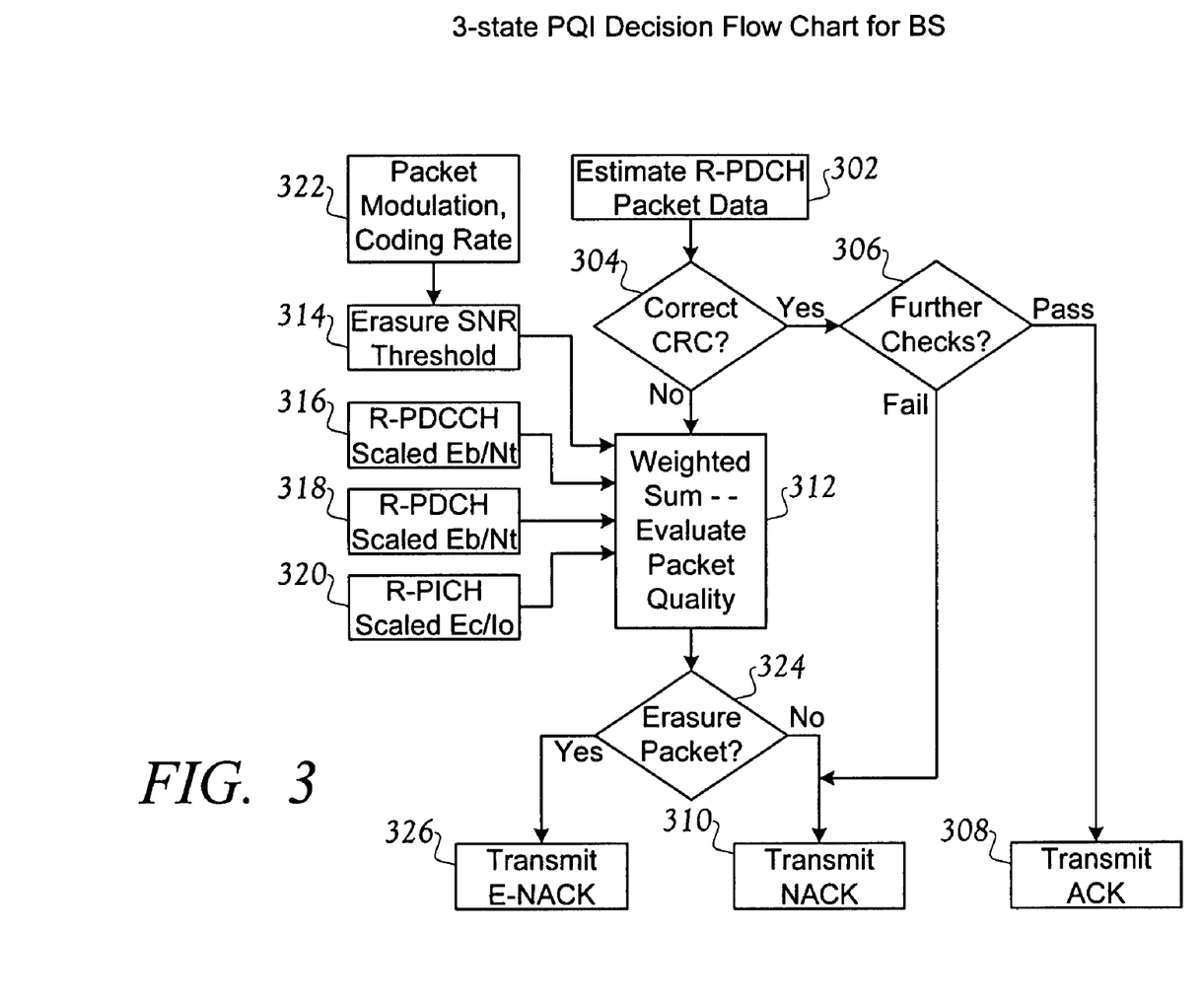
FIG. 3 is a simplified flow chart of decisions by a data receiver to generate a three state packet quality indication instead of a binary acknowledgment signal.

FIG. 3 is a flow chart illustrating an exemplary three-state PQI decision process for the BS. The data content of the underlying packet that is to be derived from the subpackets received from the MS is estimated in a packet data estimation block 302. In a decision block 304, the CRC is checked for consistency. Even if the CRC matches, however, further checks may be performed in an optional evaluation/decision block 306. There, one or more independent values reflective of channel quality may be considered additionally, to reduce the likelihood of incorrectly acknowledging a bad packet and thus requiring higher layer intervention. If such extra checks are not performed, or if they are passed, then a positive acknowledgment signal (ACK) is transmitted, as indicated in a block 308. If such extra checks are performed and failed, then a negative acknowledgment (NACK) may be directed, as indicated in a block 310.

If the CRC is determined not to be correct at the decision block 304, then a quality and usability of the subject packet will be determined in a packet quality evaluation block 312. The PQI category of the packet may be determined by comparing an erasure SNR threshold determined for the packet in a block 314 with various proxies that reflect the quality of the R-PDCH at the time the subject packet was transmitted. Each proxy value should be converted to units that are directly comparable to the units of the erasure SNR threshold. Such proxies may include an Eb/Nt for the relatively reliable R-PDCCH, scaled to reflect the coding, modulation and relative transmission power of the R-PDCCH in a block 316. An Eb/Nt measurement of the subject packet, if available, may be scaled in a block 318 and considered. An Ec/Io for a reverse pilot channel R-PICH may be scaled in a block 320 and provided to the packet quality evaluation block 312.

The value determined for an "erasure" SNR in the block 314 may be based on parameters that are relevant to the channel SNR likely to be needed to obtain useful information from the R-PDCH. For example, the modulation and coding rate applied to the particular packet may be provided in a block 322, after being determined from the R-PDCCH or from other system information sources. Then, as noted above, the erasure SNR threshold may be compared individually with each properly scaled channel quality proxy measurement. The result of the comparison is a quality value, relative to 0 dB, that reflects the channel quality indicated by such source. If the quality value derived from a source is less than 0 dB, then the source suggests that the packet is likely to be an "erasure" packet.

The weighting applied to the quality values from the various sources of evidence may take into account the relevance of the measurement to the particular packet. Such relevance may be based both on the physical relationship between the source and the packet channel, and on statistical information that reflects the correlation and variance between quality values from the source and actual SNR values of packets on the R-PDCH. For example, the R-PICH Ec/Io may be derived by averaging over a period that is not entirely coincident with the subject packet transmission. Imperfect statistical correlation between a channel quality value indicated by such Ec/Io value, on the one hand, and actual corresponding Eb/Nt values for packets on the R-PDCH on the other hand, may be used to reduce a weight given to the scaled measurement of Ec/Io. Each contribution to the estimation of packet quality may thus be individually weighted to reflect the relevance and reliability of the particular evidence. After the weighting is determined for each evidentiary source, the quality values, multiplied by such weightings, may be added If the weighted addition (logarithmic) results in a negative value, then the packet may be deemed to be an erasure packet that is unlikely to be of use for IR combining. If so, then the PQI category selected for such packet is very low quality, and a decision block 324 directs processing to a block 326 to initiate transmission of an E-NACK. If the packet is deemed not to be an erasure packet (e.g., the weighted sum is positive), then the decision block 324 directs processing to the block 310 for transmission of an ordinary NACK. The E-NACK, NACK or ACK signal indicates the PQI category determined for the packet.

Returning now to FIG. 2, after evaluating a quality category for the subject subpacket, an appropriate PQI is selected in the MAC receive block 232. In the present case, for consistency with FIG. 1, it may be assumed that the quality conclusion indicates that the packet is expected to be useful if combined with further IR subpackets. Accordingly, the PQI selected is an ordinary NACK. This value is communicated to a physical layer F-ACKCH transmission block 234 to be transmitted to the MS 204. This transmission may be controlled according to the timing indicated in FIG. 1 for the PQI signal 114. If sufficient information is implicit at the MS 204, then not only the active signals (e.g., phase-based symbol values of +1 or −1) transmitted by the transmit block 234 may be identified as distinct states, but the absence of a signal may also be reliably identified as a distinct state for the PQI.

MS Reception and Processing of PQIs

The NACK (PQI 114 in FIG. 1) transmitted from the BS 202 via the F-ACKCH 208 is received in the physical layer of the MS 204, where it is decoded in a PQI Decoding block 236. It is generally considered useful to transmit acknowledgment signals with a high SNR, and/or otherwise to ensure that they are received reliably. It is particularly important that no negative acknowledgment be misinterpreted as a positive acknowledgment (ACK), because that would likely result in an error that will not be remedied without intervention by upper layer processing. Thus, it is desirable to have the signal representing an ACK have the greatest distinction possible from all signals representing NACKs.

The PQI Decoding block 236 may be configured to recognize three distinct states of PQI based upon a signal that is typically binary in nature, such as a BPSK (binary phase shift keying) symbol. To do so, the decoding block 236 compares the received signal to an expected signal. If enough information about the expected signal(s) is known, then an absence of such signal(s) may be detected implicitly as a distinct PQI state. For example, the MS may determine the expected timing relationship between transmission of subpackets on the R-PDCH 206, and receipt of corresponding PQI signals via the F-ACKCH 208. If the coding, modulation and frequency for the F-ACKCH 208 is also known, and if the transmission power is such that active (e.g., +1 or −1) signals are readily distinguishable, then an absence of signal is almost equally distinguishable.

The decoded output from the PQI Decoding block 236 is forwarded to a data transmission MAC processing block 238.

There, the PQI may optionally be further evaluated, for example on the basis of statistical expectations. Indications, such as related channel SNRs, that are relevant to the F-ACKCH 208 may suggest that the received PQI is unreliable. In that event, a first ACK received from the BS may be treated as a NACK, while a second ACK, received under otherwise identical circumstances, is trusted to indicate that the underlying packet was correctly received. With or without such additional evaluation or filtering, the data transmission MAC processing block 238 will deduce a quality category for the previously transmitted subpacket (112 of FIG. 1, for present discussion). On the basis of the quality category derived from the received PQI, in combination with the immediate history of previous R-PDCH packet transmissions, the processing block 238 will select a next packet for transmission. An IR protocol is assumed, and hence the next packet transmitted will generally be a subpacket that is based upon some underlying data packet. The next packet will be communicated to a physical layer R-PDCH transmission block 240 for transmission to the BS 202 via the R-PDCH 206.

Figure 4:
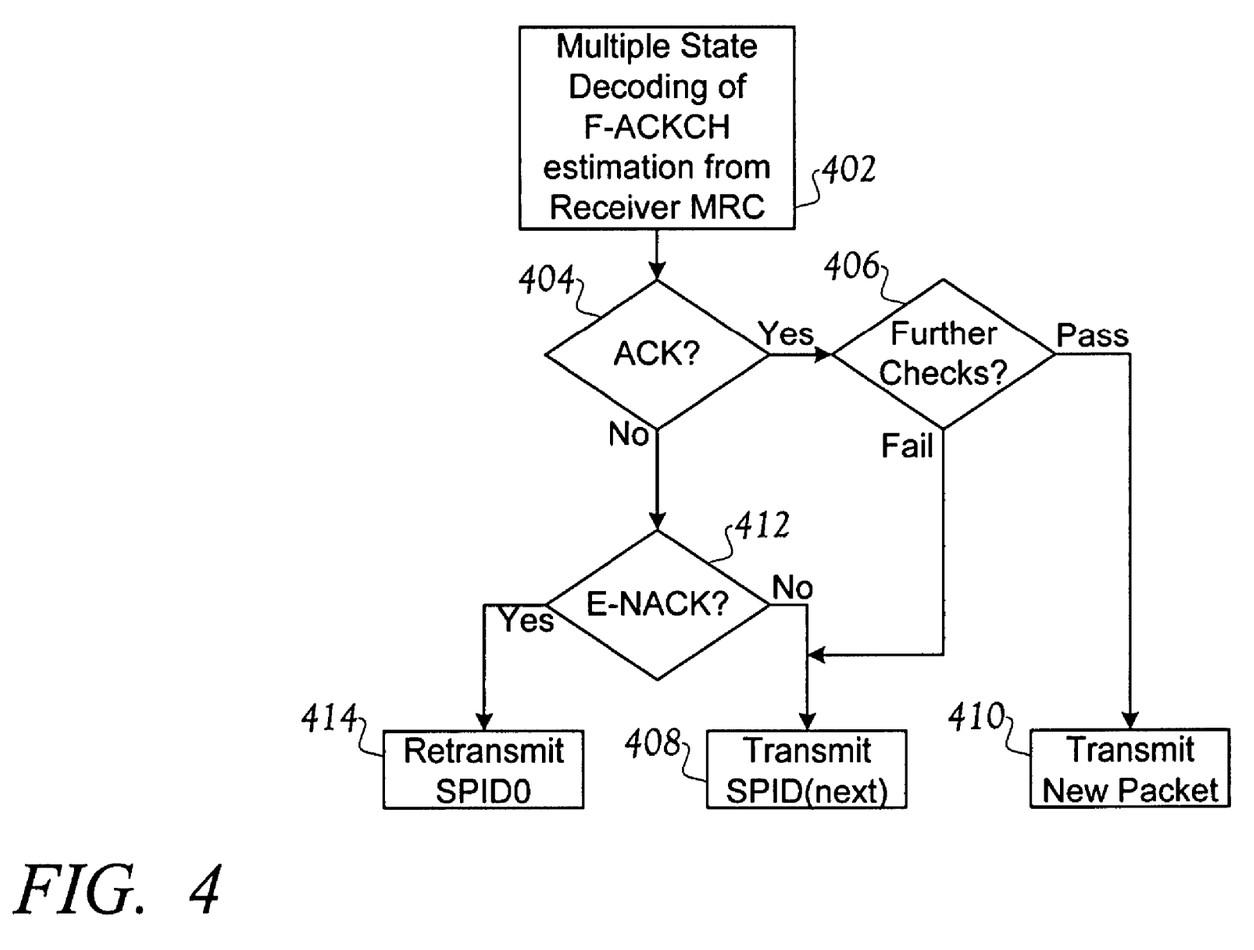
FIG. 4 is a simplified flow chart of data transmitter selection of a next packet for transmission, based upon a received packet quality indication.

FIG. 4 is a flow chart illustrating selection of a next subpacket for transmission by the MS, based upon a PQI value received from the BS. The transmitted one of multiple possible states for the PQI is deduced in a block 402. The block 402 may be a decoder that interprets the output from the maximum ratio combiner (MRC) in an F-ACKCH receiver, and may distinguish three states on the basis of phase and amplitude, such as a +1 state, a −1 state, and a zero amplitude state. If a decision block 404 determines that the decoded value appears to indicate a positive acknowledgment (ACK) PQI, then further checks may optionally be performed in a decision block 406 to reduce the probability that a signal intended as a NACK is incorrectly interpreted as an ACK. For example, if corresponding channel SNR indications suggest poor SNR during transmission of the corresponding packet, and particularly if the corresponding packet was a first subpacket SPID0, then the correctness of the apparent ACK might not be trusted, representing a failure of optional further checks in the decision block 406 that may then cause the apparent ACK to be treated as an ordinary NACK. In that case, processing would advance to a block 408 to transmit a next SPID (SPID1, presuming the PQI corresponded to an SPID0 subpacket).

If further checks are not performed, or if they are passed, then processing continues from the decision block 406 to a block 410. There, a new packet is selected for transmission (as opposed to a packet derived from the same packet as another recent packet). The new packet is generally the next data packet waiting in the queue to be sent from the MS to the BS.

If at decision block 404 an ACK was not determined, then (in a three-state protocol) the PQI is a negative acknowledgment, and is either an ordinary NACK or, if the quality is particularly poor, then the PQI is an E-NACK, indicating that the corresponding packet was essentially an "erasure" at the BS. A decision block 412 directs processing to a block 414 if the PQI is an E-NACK. As indicated in the block 414, the system may uniformly respond to an E-NACK by retransmitting the first, self-decodable, SPID0 that is derived from the same packet as the subpacket that corresponds to the PQI. Alternatives are possible. For example, in block 414 the subpacket corresponding to the PQI may be retransmitted; accordingly, if the subject subpacket was SPID1, then SPID1 will be retransmitted. However, FIG. 4 illustrates a protocol by which SPID0 will be transmitted next, even if the E-NACK corresponded to an SPID1 or an SPID2 subpacket.

Finally, if the PQI is determined not to be an E-NACK in decision block 412, then the negative acknowledgment was an ordinary NACK, and processing continues to the block 408, in which the next SPID is transmitted. For example, if the packet corresponding to the NACK was an SPID1, then in the block 408 an SPID2 based on the same underlying packet would be transmitted. SPID0 may be deemed to be the "next IR packet" after SPID 2 in a three-subpacket IR protocol. In that event, if the packet corresponding to the NACK was an SPID2, then the system may retransmit SPID0.

Returning now to FIG. 2, the next packet may have been selected in the manner described above by the data transmission MAC processing block 238 to be SPID1 (116 in FIG. 1). The MAC processing block 238 may therefore direct that such subpacket be transmitted by the transmission block 240. However, the MAC processing block 238 may also control the coding rate and modulation scheme, and/or other characteristics, applied to the R-PDCH 206. At least when coding or modulation values are changed, the MAC processing block 238 will direct an R-PDCCH transmission block 242 to transmit the new control information to the BS. The same information will concurrently be provided to the R-PDCH transmission block 240 for application to transmission of the selected packet.

In addition to using the PQI to select the next packet for transmission, the MAC processing block 238 may also use the PQI, particularly with some filtering or statistical analysis, to influence the modulation scheme and/or coding rate of transmitted packets. The PQI may thus influence the transmission parameters for the R-PDCH 206, and/or transmission parameters for the R-PDCCH 210 (or other channels).

Data Transmission from BS to MS

A reverse acknowledgment channel R-ACKCH 250, a forward packet data channel F-PDCH 252, a channel quality indicator channel CQICH 254, and a forward pilot channel F-PILOT 256 are among the most relevant channels for downlink, or forward, data transmission from the BS to the MS. The channel quality indicator (CQI) conveyed via the CQICH is not based upon particular packets, but rather indicates a channel quality more generally. Data for the MS is presented to a data transmission MAC processing block 258 in the BS 202. An IR (incremental redundancy) protocol will be assumed, though of course any data transmission protocol may be used. The MAC processing block 258 selects an IR subpacket, and forwards it to an F-PDCH transmission block 260 in the physical layer of the BS. The three lines entering the block 260 indicate control of the coding rate, the modulation scheme, and the packet data by the MAC processing block 258.

In the MS physical layer 214, the transmitted subpacket is received in an F-PDCH decoding block 262. When appropriate, combining with related previous packets may take place in the block 262, or in a data reception MAC processing block 264 of the MS 204. The MAC processing block 264 checks the CRC of the packet derived from the received subpacket. If the CRC matches, the block 264 may instruct an R-ACKCH transmission block 266 to transmit a positive acknowledgment, or ACK. If not, the transmission block 266 may be directed to transmit a NACK.

At an R-ACKCH decoding block 268 in the BS physical layer 212, the ACK or NACK will be detected and forwarded to the MAC processing block 258. Even if the acknowledgment signals are merely binary (ACK or NACK), the MAC processing block 258 may flexibly select a next packet for transmission from among a plurality of options when a NACK is received. The technique employed may require evaluation of a failed packet, which may be analogous to that described above for selection of a PQI by the BS data reception MAC processing block 232. While a multi-state acknowledgment HARQ signal can convey to the transmitter a failed packet quality determined at the data receiver, a binary acknowledgment HARQ does not distinguish different failed packet qualities. As such, in a binary acknowledgment system, the data transmitter must perform the quality evaluation function if it is desired. To perform the analogous evaluation, the MAC processing block 258 may determine an SNR value for a channel that can serve as a proxy for the F-PDCH. It may also determine an "F-PDCH erasure quality threshold," scaling the SNR value into comparable units. If the best proxy information suggests that the F-PDCH SNR is likely below the erasure quality threshold, then it will be efficient to presume that a packet is an "erasure" packet. The next packet for transmission may then be selected accordingly, based upon a comparison of the SNR of the proxy to the erasure threshold SNR.

Moving the evaluation of failed packets to the data transmitter solves the problem that binary acknowledgment cannot convey failed packet quality, but raises a problem that the data transmitter has less information and proxies available to estimate such failed packet quality. The best proxy available at the data transmitter (BS) may be the CQI value conveyed by the CQICH. While the CQI value is detailed (it is invariably maintained as a value having more than four bits of resolution), it may not be closely enough correlated to particular F-PDCH packets. As such, flexible packet retransmission based on the CQI may not be entirely satisfactory. An alternative is to employ multi-state acknowledgment signals for both uplink and downlink communications. Thus, it may be useful to extend the R-ACKCH (for downlink data) in a manner described above with respect to the F-ACKCH (for uplink data), so that a PQI is prepared at the MS and transmitted via the R-ACKCH 250 to provide a quality indication that is specific to the particular corresponding packet. Such a "downlink PQI" may be generated in the data reception MAC processing block 264 of the MS 204, by means of operations similar to those described above with respect to the data reception MAC processing block 232 of the BS 202.

A data receiver is likely to have better access to good proxy information with respect to a particular packet. In particular, the MAC processing block 264 of the MS may have better access to information that is closely indicative of quality of the particular packet to which a PQI (packet quality indication, e.g., an acknowledgment signal comprising quality information) corresponds. The proxies available at the MS may include an Ec/Io derived from the F-PILOT 256, which may be discounted to reflect less-than-perfect statistical correlation to the F-PDCH generally. As was described with respect to the BS, other proxy SNR measurements may be used, such as measurements based upon the F-PDCH itself, or upon a forward packet data control channel (F-PDCCH, not shown). Accordingly, even downlink data communications may benefit from the use of multi-state acknowledgments conveying a PQI.

If the tristate acknowledgment protocol described for data transmissions from the MS to the BS is employed also for data transmissions from the BS to the MS, the resulting PQI may be used for more than selecting between alternative packets for next transmission. For example such a PQI value may, as with data from MS to BS, be used to identify ACKs that are likely to be "false positives," and to accordingly treat such ACKs as ordinary NACKs.

Transmission of PQIs

It is desirable to provide quality information in conjunction with acknowledgments of each packet or subpacket that is transmitted, but undesirable to increase the transmission overhead. In one family of embodiments, a single symbol is transmitted from the receiving station (e.g. BS) to the transmitting station (e.g., MS) as an acknowledgment signal. The single symbol conveys any one of a multiplicity of different states (acknowledgment categories) of a PQI. For example, a single symbol in a code division multiplexed (CDM) system may indicate one of $2^N$ different states (N a positive integer) depending upon the phasing applied to the symbol.

Acknowledgment signals are traditionally binary signals conveying two states, ACK or NACK. One aspect of the method set forth herein is applicable to any system that typically uses binary signaling. This aspect is the extension of such binary signaling to tristate or multistate, such as by recognition of amplitude variations (e.g., zero amplitude) in conjunction with binary, non-amplitude encoding procedures. By conveying three or more different states in place of traditionally binary states, the original information may be conveyed plus an associated quality indication.

As a more particular example of a technique that may be used for acknowledgment signals, binary phase shift keying (BPSK), yielding either a +1 or a −1 for a symbol, may be employed because it is a very robust phase encoding technique. However, single BPSK symbols do not generally convey the requisite multiplicity of states to serve as a multiple-state acknowledgment signal. In one simple but effective embodiment, the absence of a signal—zero amplitude—may be recognized as conveying a state, in addition to the usual +1 and a −1, for a total of three states. Thereby, a single symbol, using essentially BPSK encoding plus "off," is enabled to convey three different states (i.e., is tristate). For acknowledgment purposes, the three states may indicate ACK, NACK, and E-NACK. Notably, even if multiple acknowledgment states are distinguished by a single symbol, the symbol may be repeated to enhance the probability of correct detection through redundancy, or time diversity.

Information may be conveyed by the absence of a signal when a signal is expected within certain known parameters, but is not received. Thus, for example, a transmitter (e.g. MS) may expect to receive an acknowledgment signal in one of a plurality of states, on a particular "channel," and within a particular time window. The expected states may be any one of those allowable, such as +1 or −1 in BPSK, or 1+j, 1−j, j−1 and −1−j in QPSK. The particular channel may be defined, for example by some combination of one or more orthogonal codes, modulations, frequencies and/or sideband distinctions, or by inclusion in a packet having a header that identifies it as conveying such channel. The expected time window may, for example, be determined with respect to the transmission time (by the transmitting station) of the packet corresponding to the expected acknowledgment, according to measured and/or mandated response delays associated with the receiving station (e.g. BS). The absence of a signal in the expected range (a type of amplitude modulation) may be interpreted as indicating a distinct state. Other types of amplitude modulation may be employed, either additionally or in the alternative, to convey a multiplicity of categories (or states) for the acknowledgment signals.

A tristate acknowledgment signal (+1, −1, off) has been described. Of course, numerous other techniques may be employed to convey a multiple-state acknowledgment signal such that a plurality of different NACKs may be distinguished by the transmitting station (e.g. MS). Single symbols may be used to provide $2^N$ different states by means of progressively more complex phase modulation techniques, and the addition of a zero amplitude condition may add a further identifiable state for a total of $2^N+1$ states. Instead of a single symbol, a plurality of symbols may be employed in combination to provide any desired number of different identifiable states. The number of different identifiable states conveyed by multiple bits will also typically be $2^N$ for N a positive integer, and such number is extendible to $2^N+1$ by including a zero amplitude state, as described above.

More complex acknowledgment signal alternatives may convey additional information, and may serve additional needs. However, even complex acknowledgment signals remain distinct from more general data communications. For example, irrespective of other functions, acknowledgment signals integrally convey positive or negative acknowledgment of satisfactory receipt in respect of a particular packet. This function has at least two important implications: first, acknowledgment signals should be received very reliably. It is especially desirable that no category of NACK be incorrectly interpreted as a positive acknowledgment (ACK), which would cause a defective packet to go unrepaired, at least by the H-ARQ procedure. Such reliability considerations may increase the level of robustness with which acknowledgment signals are transmitted, rendering information transmitted as part of an acknowledgment signal relatively "expensive" in terms of bandwidth absorbed per effective bit transmitted. Moreover, acknowledgment signals are generally returned after each and every packet received. Such frequent transmission means that even a modest increase in overhead associated with each acknowledgment signal could absorb significant bandwidth. These two factors discourage the use of complex or lengthy acknowledgment signals, unless the information conveyed is of particularly high effectiveness in enhancing throughput. The simple embodiment using tristate acknowledgments represents one useful balance between complexity (low) and bandwidth use (low), versus enhancement of communication efficiency (moderate, depending upon the H-ARQ protocol that is implemented). Other, perhaps even more efficient balances may be achieved between performance enhancement and media usage.

Even for a simple tristate acknowledgment protocol in conjunction with a three-subpacket IR protocol, a wide variety of alternative implementations are possible. For example, consider an IR subpacket sequence, as described above, consisting of SPID0 (from which the underlying packet can be reconstructed under best case), as well as SPID1 and SPID2 (from which the underlying packet cannot be reconstructed in the absence of information from SPID0). A NACK (received by the transmitting station) will generally result in transmitting the next IR subpacket in the series, but an E-NACK (erasure or enhanced NACK) may be treated differently depending upon which of the three IR subpackets was most recently transmitted. If SPID0 was just transmitted, E-NACK may result, for example, in either retransmission of SPID0, or in transmission of a SPID3, a subpacket different from SPID0 but based upon the same underlying packet, and theoretically conveying sufficient information to reconstruct the particular packet. If SPID1 was just transmitted, then the transmitting station may respond to an E-NACK by retransmitting SPID0, or transmitting SPID3, or retransmitting SPID1. If an E-NACK is received in response to SPID2, the most likely response options are to retransmit SPID0 or SPID2, or to transmit SPID3 (as described above). Engineering considerations, such as measured or simulated performance, will identify the most effective protocol for expected conditions.

In one family of embodiments, flexible retransmission as described herein is employed for packet transmissions from an MS to a BS. It is particularly suitable in this circumstance, because such transmissions have hitherto not elicited any indication of transmission quality from the BS. However, the quality indication provided by a multi-state acknowledgment signal may serve a variety of functions in addition, or alternatively, to controlling selection of the next packet to be transmitted from among a multiplicity of options. For example, additional decisions such as transmit power level, coding schemes, and modulation techniques used by the MS may be influenced by the channel quality information provided by the acknowledgment signal corresponding to particular packet transmissions. For such purposes, an average channel quality estimate that is maintained at the MS may be updated based upon PQIs. The resulting estimate of the channel quality from the MS to the BS may therefore have substantially higher resolution than the quality estimate conveyed with acknowledgment signals.

Because channel quality information is typically fed back on a regular basis from MSs to BSs in a Channel Quality Indication (CQI) signal, flexible retransmissions for forward packet transmissions (from a BS to an MS) may be implemented using simple binary acknowledgment signals from the MS to the BS, together with CQI information. However, CQI information is significantly different from multistate acknowledgment signals. First, CQI information does not represent information about the quality of a particular packet. Second, the CQI is not integrally combined with an acknowledgment signal, and thus does not have the same needs for prompt timing and high reliability that generally apply to multistate acknowledgment signals. Moreover, the CQI exists as a multi-bit quantity having far more than two quality states, and is not transmitted in a single symbol. Single symbols may be used to incrementally adjust a multi-bit CQI value, but such bit would not by itself suitably control the selection of a next packet to send. Rather, the "next packet" decision would need to be based upon the overall multi-bit CQI value maintained at the BS. The reasons for this are evident in the considerations for selection of the appropriate one of a multiplicity of acknowledgment signals to acknowledge particular uplink (MS to BS) data packets (or subpackets), as explained below.

H-ARQ protocols may be distinguished from higher layer automatic retransmission protocols in various ways. First, in H-ARQ protocols, each packet is responded to by the receiving station with feedback as to success. Such feedback typically takes the form of a positive acknowledgment (ACK) or negative acknowledgment (NACK) corresponding to each transmitted packet, which is transmitted back to the packet transmitting station from the receiving station. Second, performance of the analysis of each received packet, and preparation and transmission of the corresponding feedback (acknowledgment) is generally restricted to the MAC layer (and to the physical layer that is between the MAC layer and the channel media itself). Additionally, the association between particular acknowledgment signals and the transmitted packet to which they correspond (i.e., to which their feedback is relevant) is typically implicit, in that the feedback need not be accompanied by data that explicitly identifies the relevant packet. The implication may be conveyed, for example, by the channel used for such acknowledgment signal, and/or by the temporal relationship of the acknowledgment signal to known features of other signals, or to the corresponding packet itself. These, or other distinctions known to those of skill in the art, will serve to differentiate H-ARQ retransmission protocols from higher level retransmission protocols.

CONCLUSION

The foregoing description illustrates exemplary implementations, and novel features, of a method, apparatus, or system that provides multistate feedback in place of binary feedback. In particular, a multiplicity of different acknowledgment signals may serve as a packet quality indication, providing a data transmitting station with information to enable it to modify selection of subsequent packets for transmission to more efficiently ensure accurate reception. Various alternative implementations are suggested, but it is impractical to list all such alternatives. As such, the scope of the presented invention should be determined only by reference to the appended claims, and should not be limited by features illustrated in the foregoing description except insofar as such feature is recited as a limitation in an appended claim.

While the above description has pointed out novel features of the invention as applied to various embodiments, the skilled person will understand that various omissions, substitutions, and changes in the form and details of the methods and systems illustrated may be made without departing from the scope of the invention. As particular, non-limiting examples, the communication need not be a CDMA system such as is described in the exemplary embodiment. MS (mobile station) and BS (base station) functionality are specifically indicated, but that is for a typical system. Both such stations are transceivers, and are for many purposes interchangeable. Thus, the data transmitting station need not be an MS, but may be a one-to-once transceiver, or a BS. Conversely, the data receiving station need not be a BS, but may be any appropriate type of transceiver station.

Each practical and novel combination of the elements described hereinabove, and each practical combination of equivalents to such elements, is contemplated as an embodiment of the invention. Because many more element combinations are contemplated as embodiments of the invention than can reasonably be enumerated explicitly herein, the scope of the invention may properly be defined only by the appended claims, rather than by the foregoing description. All variations coming within the meaning and range of equivalency of the various claim elements are embraced within the scope of the corresponding claim. Each claim set forth below is intended to encompass any system or method that differs only insubstantially from the literal language of such claim, as long as such system or method is not, in fact, an embodiment of the prior art. To this end, each described element in each claim should be construed as broadly as possible, and moreover should be understood to encompass any equivalent to such element, insofar as possible without also encompassing the prior art.

What is claimed is:

1. A method of transmitting data packets in a wireless communication system, comprising:
    a) transmitting, by a transmitter, in said wireless communication system, data subpackets to a receiving station, each derived from a corresponding parent data packet;
    b) for each data subpacket, receiving from the receiving station a reception quality signal indicating in which of a multiplicity of distinct selectable reception quality categories the data subpacket was received; and
    c) selecting a next subpacket for transmission under control of a reception quality signal corresponding to a particular previous subpacket, including
        i) transmitting a new subpacket not derived from a same parent data packet as the particular previous subpacket if the corresponding reception quality signal indicates a first, high quality or transmission success reception quality category,
        ii) transmitting a first related subpacket, derived from the same parent data packet as the particular previous subpacket if the corresponding reception quality signal indicates a second, intermediate reception quality category for the particular previous subpacket, and
        iii) transmitting a different second related subpacket, derived from the same parent data packet as the particular previous subpacket, if the corresponding reception quality signal indicates a third, lower than intermediate reception quality category for the particular previous subpacket.

2. The method of claim 1, wherein the reception quality signal is an acknowledgment signal, and alternative responses of step (c)(i-iii) are part of a hybrid automatic retransmission request protocol.

3. The method of claim 1, wherein the data packets are transmitted by a subject mobile station (MS) in a wireless cellular communication system and the receiving station is a base station in the system that concurrently communicates independent information with a multiplicity of other MSs.

4. The method of claim 1, wherein at least one of the multiplicity of reception quality categories is indicated by a zero amplitude reception quality signal.

5. The method of claim 4, wherein at least one of the multiplicity of reception quality categories is indicated by a phase of the reception quality signal.

6. The method of claim 1, further comprising receiving exactly 2N+1 different reception quality signals indicative of 2N+1 corresponding different selectable reception quality categories, N a positive integer.

7. The method of claim 1, wherein the reception quality category of each transmitted data subpacket is indicated by a single symbol of the corresponding reception quality signal.

8. The method of claim 7, wherein the single symbol is repeated within the reception quality signal.

9. Apparatus for transmitting data packets in a wireless communication system, comprising:
    a) a transmitter capable of transmitting packet data prepared by a packet data processing module configured to select subpackets for transmission to a target receiver, wherein one or more subpackets are derived from each of a plurality of source data packets to be conveyed to the target receiver;
    b) receiving circuitry configured to receive from the target receiver, for each transmitted data subpacket, a corresponding reception quality signal indicating in which of a multiplicity of distinct selectable reception quality categories the data subpacket was received by the target receiver;
    c) wherein the packet data processing module includes control features configured to select a next subpacket for transmission based upon the reception quality signal corresponding to a particular previous subpacket, the control features specifically configured to select the next subpacket to be
        i) a new subpacket not derived from the same source data packet as the particular previous subpacket, if the corresponding reception quality signal indicates the particular previous subpacket was assigned to a first reception quality category to reflect that the particular previous subpacket was received with a high quality, ii) a first related subpacket derived from the same source data packet as the particular previous subpacket, if the corresponding reception quality signal indicates the particular previous subpacket was assigned to a second reception quality category to reflect that the particular previous subpacket was received with an intermediate quality that is lower than said high quality, and iii) a different second related subpacket derived from the same source data packet as the particular previous subpacket, if the corresponding reception quality signal indicates the particular previous subpacket was assigned to a third reception category to reflect that the particular previous subpacket was received with a low quality that is lower than said intermediate quality.

10. The apparatus of claim 9, wherein the packet data processing module control features of element (c) are part of a hybrid automatic retransmission request (HARQ) system within the apparatus, and the reception quality signals are recognized as acknowledgement signals.

11. The apparatus of claim 9, wherein the apparatus is a subject mobile station (MS) in a wireless cellular communication system and the target receiving station is a base station in the cellular communication system that concurrently communicates independent information with a multiplicity of other MSs.

12. The apparatus of claim 9, wherein one of the multiplicity of reception quality categories is indicated by a zero amplitude reception quality signal.

13. The apparatus of claim 12, wherein at least one of the multiplicity of reception quality categories is indicated by a phase of the reception quality signal.

14. The apparatus of claim 9, further comprising receiving exactly 2N+1 different reception quality signals indicative of 2N+1 corresponding different selectable reception quality categories, N a positive integer.

15. The apparatus of claim 9, wherein the reception quality category of each transmitted data subpacket is indicated by a single symbol of the corresponding reception quality signal.

16. The apparatus of claim 15, wherein the single symbol is repeated within the reception quality signal.

* * * * *